United States Patent
Guo et al.

(10) Patent No.: US 8,619,385 B1
(45) Date of Patent: Dec. 31, 2013

(54) DISK DRIVE BIASING SYNC PATTERN OF AN EXTENDED SYNC MARK

(75) Inventors: Guoxiao Guo, Foothill Ranch, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 232 days.

(21) Appl. No.: 13/015,844

(22) Filed: Jan. 28, 2011

(51) Int. Cl.
*G11B 5/00* (2006.01)

(52) U.S. Cl.
USPC .......... 360/77.08; 360/55; 360/39; 369/30.25

(58) Field of Classification Search
USPC .......... 369/47.48, 47.27, 53.16, 59.25, 30.25, 369/44.25; 360/39, 55, 77.05, 77.08
See application file for complete search history.

(56) References Cited

U.S. PATENT DOCUMENTS

| | | | |
|---|---|---|---|
| 4,949,200 A | 8/1990 | Weng | |
| 5,459,623 A | 10/1995 | Blagaila et al. | |
| 5,757,567 A | 5/1998 | Hetzler et al. | |
| 5,784,219 A | 7/1998 | Genheimer | |
| 5,825,318 A * | 10/1998 | Patapoutian et al. | 341/131 |
| 5,852,522 A | 12/1998 | Lee | |
| 5,909,334 A | 6/1999 | Barr et al. | |
| 5,917,439 A | 6/1999 | Cowen | |
| 5,982,308 A | 11/1999 | Bang | |
| 6,005,727 A | 12/1999 | Behrens et al. | |
| 6,038,091 A | 3/2000 | Reed et al. | |
| 6,043,946 A | 3/2000 | Genheimer et al. | |
| 6,075,667 A | 6/2000 | Kisaka et al. | |
| 6,115,198 A | 9/2000 | Reed et al. | |
| 6,118,603 A | 9/2000 | Wilson et al. | |
| 6,130,798 A | 10/2000 | Chang et al. | |
| 6,201,652 B1 | 3/2001 | Rezzi et al. | |
| 6,226,138 B1 | 5/2001 | Blaum et al. | |
| 6,233,715 B1 | 5/2001 | Kuki et al. | |
| 6,313,963 B1 | 11/2001 | Hsieh | |
| 6,345,021 B1 | 2/2002 | Belser et al. | |
| 6,369,969 B1 * | 4/2002 | Christiansen et al. | 360/66 |
| 6,405,342 B1 | 6/2002 | Lee | |
| 6,411,452 B1 * | 6/2002 | Cloke | 360/51 |
| 6,434,719 B1 | 8/2002 | Livingston | |
| 6,603,622 B1 * | 8/2003 | Christiansen et al. | 360/66 |
| 6,639,748 B1 * | 10/2003 | Christiansen et al. | 360/66 |
| 6,661,593 B2 | 12/2003 | Ashikaga et al. | |
| 6,738,205 B1 | 5/2004 | Moran et al. | |
| 6,856,480 B2 | 2/2005 | Kuki et al. | |
| 6,876,316 B1 | 4/2005 | Wu | |
| 7,047,477 B2 | 5/2006 | Tolhuizen et al. | |
| 7,054,398 B1 | 5/2006 | Wu et al. | |

(Continued)

OTHER PUBLICATIONS

Hagenauer et al., "A Viterbi Algorithm with Soft-Decision Outputs and its Applications," in Proc. IEEE Global Telecommunications Conference 1989, Dallas, Texas, Nov. 1989, pp. 1680-1686.

*Primary Examiner* — Thomas Alunkal

(57) ABSTRACT

A disk drive is disclosed comprising a disk including a plurality of sectors each comprising a sector sync mark pattern and sector data preceding and following the sector sync mark pattern, and a head actuated over the disk for generating a read signal. A data sequence is detected from the read signal, and the data sequence is correlated with an extended sync mark comprising a target sync mark pattern and target data. The correlation of the target sync mark pattern with the data sequence is biased relative to the correlation of the target data with the data sequence.

24 Claims, 6 Drawing Sheets

(56) References Cited

U.S. PATENT DOCUMENTS

| | | |
|---|---|---|
| 7,092,177 B2 | 8/2006 | Ehrlich |
| 7,099,095 B1 | 8/2006 | Subrahmanyam et al. |
| 7,206,157 B2 | 4/2007 | Ehrlich |
| 7,212,364 B1 * | 5/2007 | Lee .................................. 360/51 |
| 7,266,666 B2 | 9/2007 | Brune |
| 7,369,343 B1 | 5/2008 | Yeo et al. |
| 7,440,210 B1 * | 10/2008 | Lee .................................. 360/51 |
| 7,502,187 B2 | 3/2009 | Annampedu et al. |
| 7,800,853 B1 | 9/2010 | Guo et al. |
| 7,881,164 B1 * | 2/2011 | Han et al. .................. 369/44.11 |
| 2005/0265198 A1 * | 12/2005 | Yen ............................. 369/59.19 |
| 2006/0092803 A1 * | 5/2006 | Tatsuzawa et al. ......... 369/59.22 |

* cited by examiner

US 8,619,385 B1

DISK DRIVE BIASING SYNC PATTERN OF AN EXTENDED SYNC MARK

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $6_0$-$6_N$ recorded around the circumference of each data track. Each servo sector 6, may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Each data track is typically divided into a number of data sectors for storing user data, wherein each data sector comprises a preamble and sync mark similar to the servo sectors. The sync mark enables the control circuitry to symbol synchronize to the user data after synchronizing timing recovery and gain control to the preamble. If the sync mark is corrupted by a defect on the disk, it may render the corresponding sector (servo or data) difficult or even impossible to recover. In some designs, if a servo sync mark is corrupted, the corresponding servo sector is typically ignored which can degrade performance of the servo system.

DETAILED DESCRIPTION OF EMBODIMENTS OF THE INVENTION

Figures 2A, 2B:
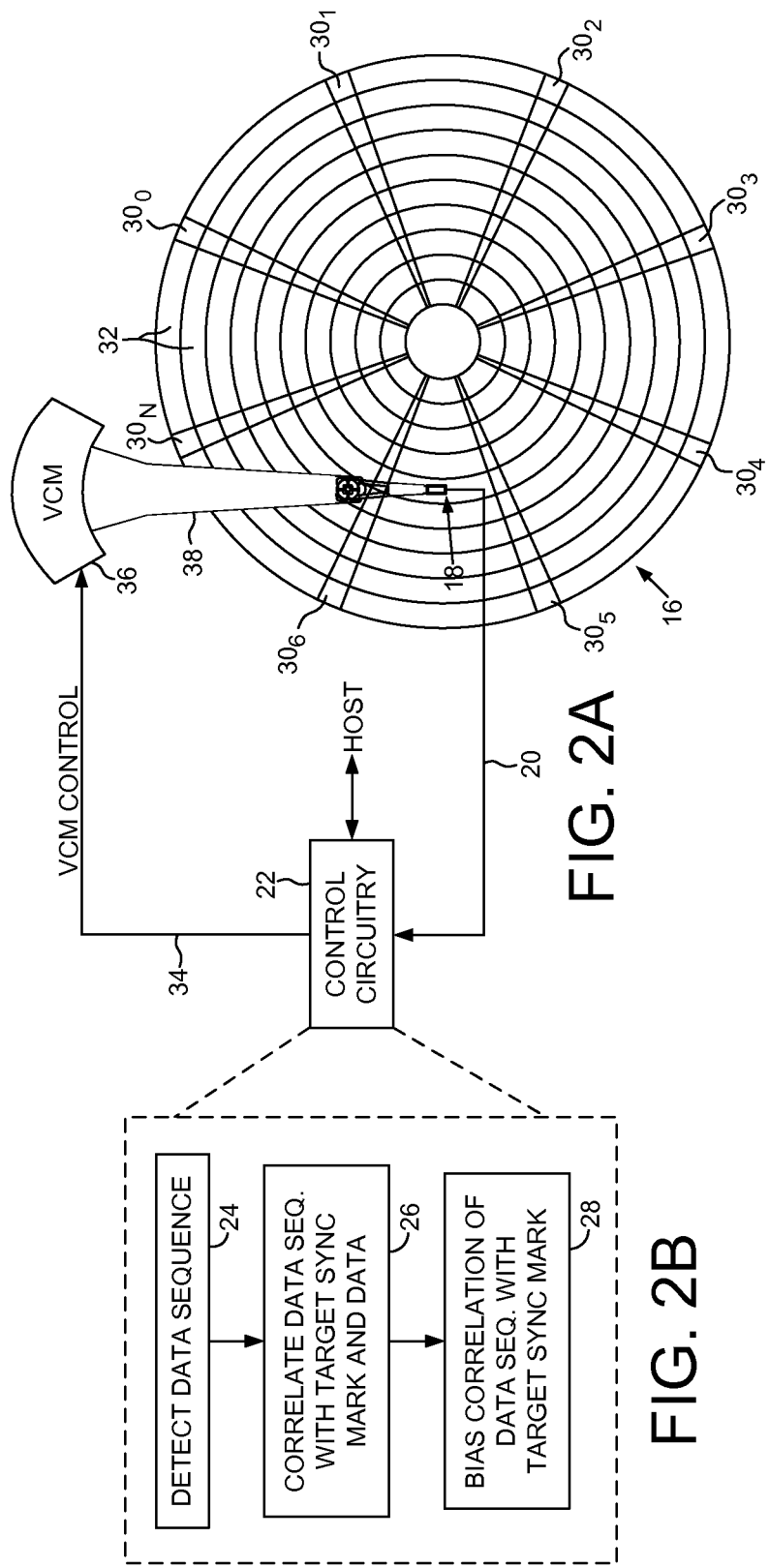
FIG. 2A shows a disk drive according to an embodiment of the present invention comprising a head actuated over a disk and control circuitry.
FIG. 2B is a flow diagram executed by the control circuitry wherein a detected data sequence is correlated with a target sync mark and target data to detect a sector sync mark, and the correlation with the target sync mark is biased relative to the correlation with the target data according to an embodiment of the present invention.

FIG. 2A shows a disk drive according to an embodiment of the present invention comprising a disk 16 including a plurality of sectors each comprising a sector sync mark pattern and sector data preceding and following the sector sync mark pattern, and a head 18 actuated over the disk 16 for generating a read signal 20. The disk drive further comprises control circuitry 22 operable to execute the flow diagram of FIG. 2B, wherein a data sequence is detected from the read signal (step 24), and the data sequence is correlated with an extended sync mark comprising a target sync mark pattern and target data (step 26). The correlation of the target sync mark pattern with the data sequence is biased relative to the correlation of the target data with the data sequence (step 28).

Figure 1:
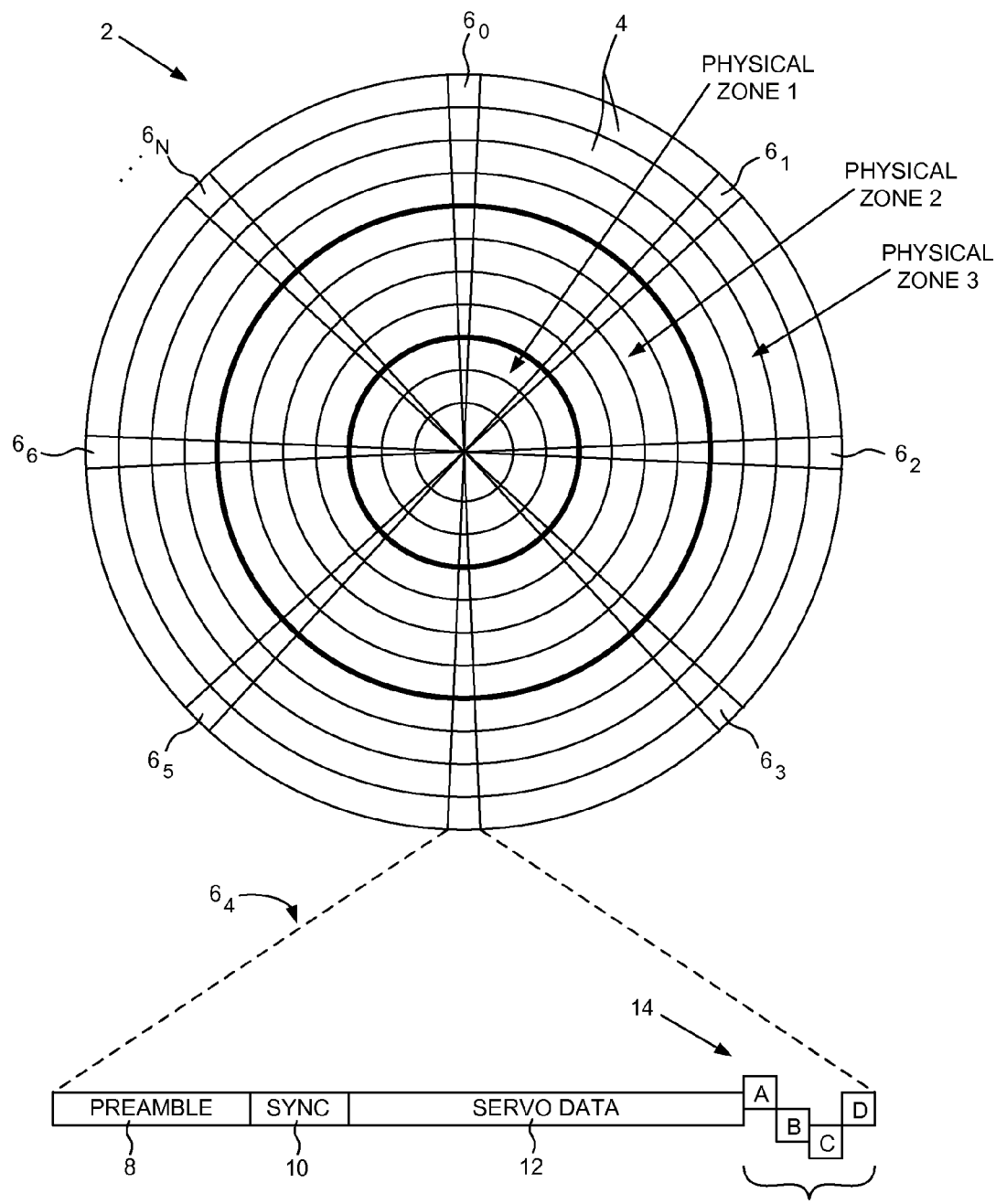
FIG. 1 shows a prior art disk format comprising a plurality of data tracks defined by embedded servo sectors, wherein each data track comprises a plurality of data sectors.

In the embodiment of FIG. 2A, the disk 16 comprises a plurality of servo sectors $30_0$-$30_N$ that define a plurality of data tracks 32. The control circuitry 22 processes the read signal 20 emanating from the head 18 to demodulate the servo sectors $30_0$-$30_N$ into a position error signal (PES). The PES is filtered with a suitable compensation filter to generate a control signal 34 applied to a voice coil motor (VCM) 36 which rotates an actuator arm 38 about a pivot in order to position the head 18 radially over the disk 16 in a direction that reduces the PES. The servo sectors $30_0$-$30_N$ may comprise any suitable position information, such as a track address for coarse positioning and servo bursts for fine positioning as described above with reference to FIG. 1.

In one embodiment, each data track 32 in FIG. 2A comprises a plurality of data sectors, wherein each data sector comprises a data sync mark pattern and sector data preceding and following the data sync mark pattern. Similarly, each servo sector 30 may comprise a servo sync mark pattern and sector data preceding and following the servo sync mark pattern. For example, the sector data preceding either a data sync mark pattern or a servo sync mark pattern may be preamble data which typically comprises a periodic pattern that allows proper gain adjustment and timing synchronization of the read signal. The sector data following a servo sync mark pattern may comprise at least part of a track address. In the embodiments disclosed herein, the sector sync mark pattern may comprise a data sync mark pattern and/or a servo sync mark pattern, or any other suitable sector sync mark pattern that may be recorded on the disk.

Figure 3:
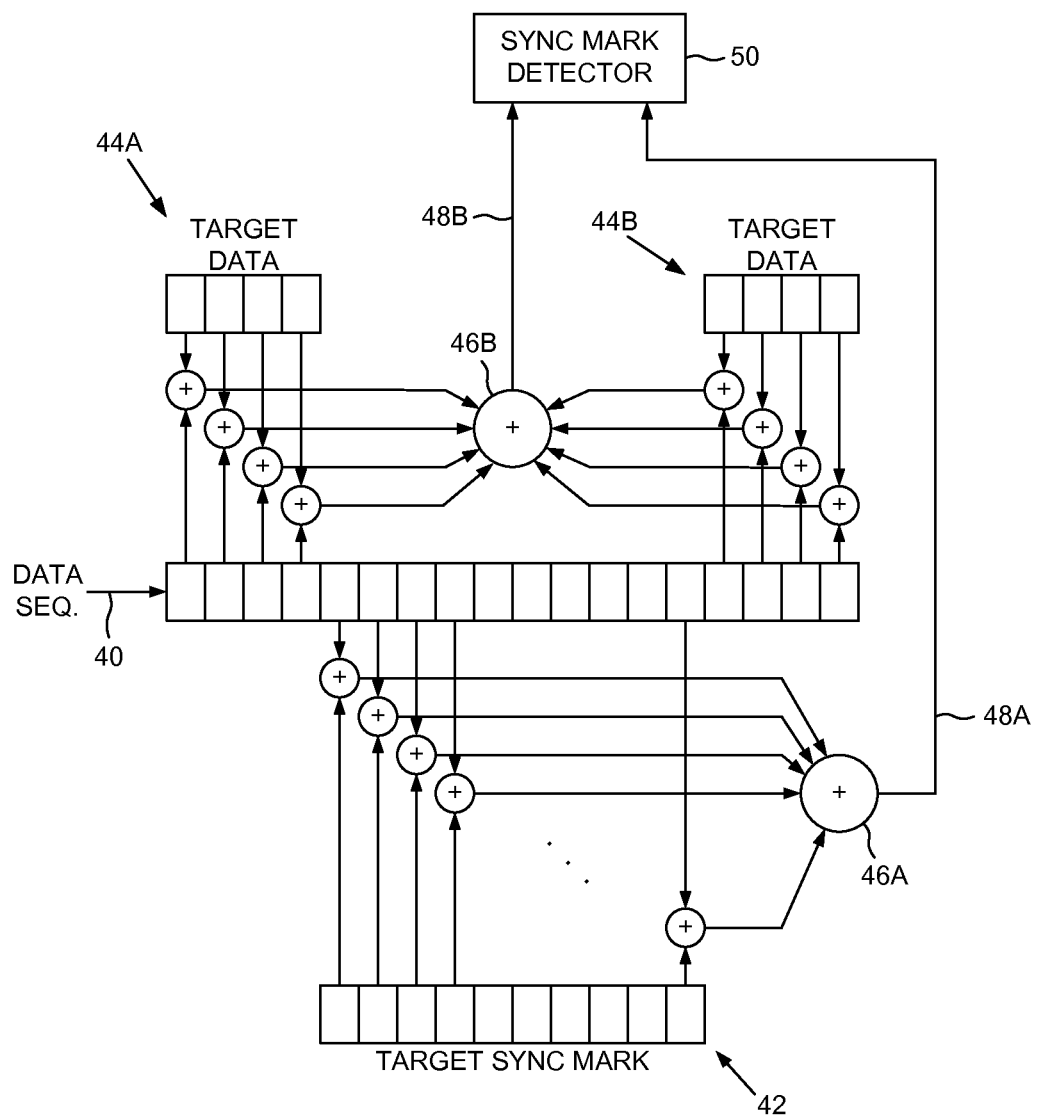
FIG. 3 shows an embodiment of the present invention wherein the control circuitry comprises first and second correlators for correlating the detected data sequence with the target sync mark and the target data.

FIG. 3 shows an embodiment of the present invention for correlating the detected data sequence 40 with the target sync mark pattern 42 and the target data 44A and 44B. The target sync mark pattern and the target data may comprise any suitable number of bits, wherein in the embodiment of FIG. 3 the target sync mark pattern 42 comprises 10 bits and the target data 44A and 44B comprises 8 bits. In other embodiments, the target data in the extended sync mark may correspond to only sector data preceding the sector sync mark pattern or following the sector sync mark pattern (rather than both preceding and following as shown in the embodiment of FIG. 3).

The detected data sequence 40 is correlated with the target sync mark pattern 42 and the target data 44A and 44B using XNOR circuits, wherein the output of an XNOR circuit is 1 if a bit in the detected data sequence matches the corresponding bit in the target sync mark pattern or the target data. A first adder 46A sums the outputs of the target sync mark pattern XNOR circuits to generate a first correlation 48A, and a second adder 46B sums the outputs of the target data XNOR circuits to generate a second correlation 48B. A sync mark detector 50 biases the first correlation 48A relative to the second correlation 48B in order to detect the sector sync mark pattern in the detected data sequence 40. In other embodiments, the biasing may occur as part of one or more of the correlations, such as by scaling an output of each XNOR circuit used to correlate the target sync mark pattern 42 with the detected data sequence 40.

Figure 4:
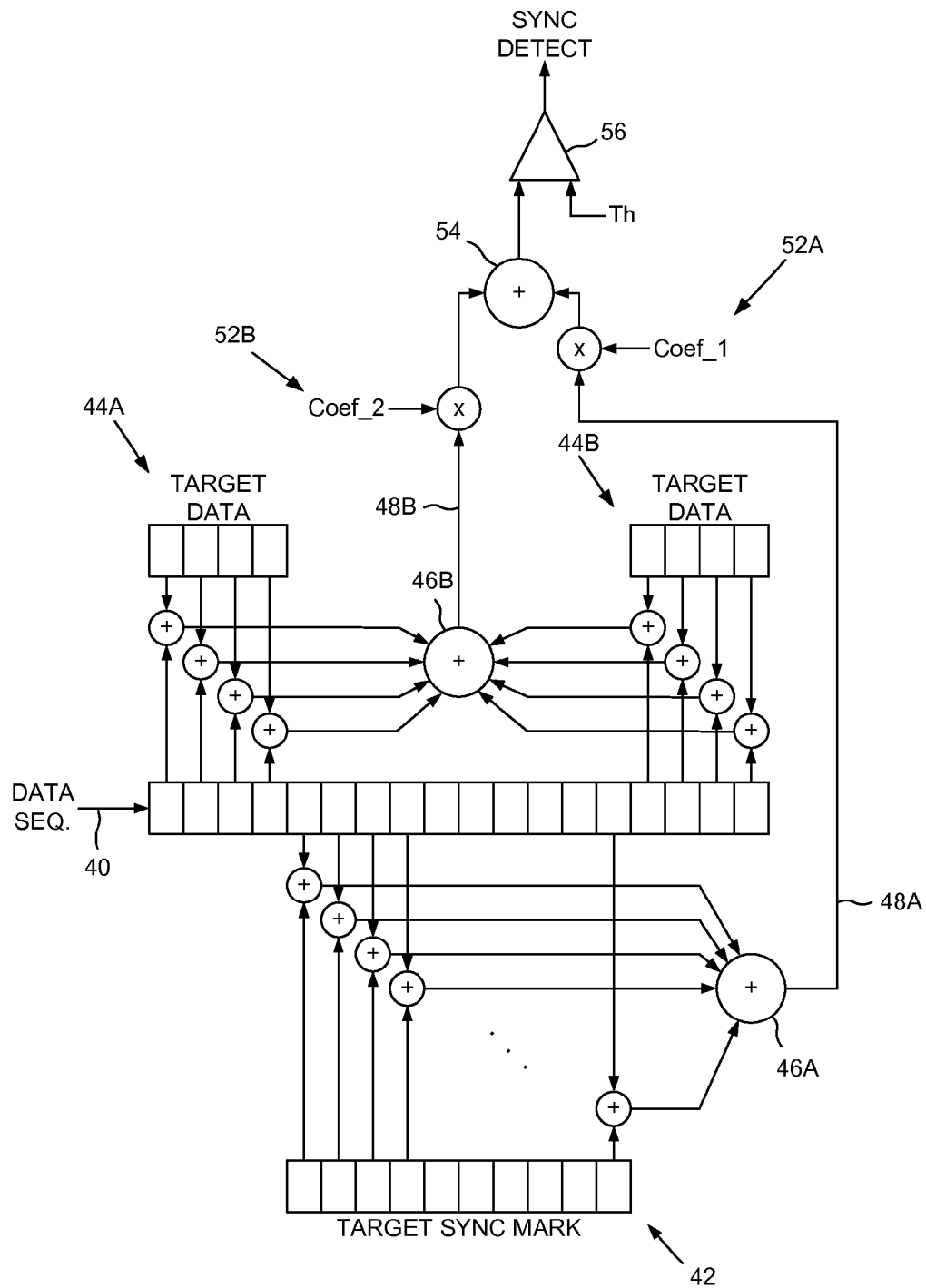
FIG. 4 shows an embodiment of the present invention wherein an output of the first correlator is scaled by a first coefficient and the output of the second correlator is scaled by a second coefficient in order to bias the relative correlations.

The sync mark detector 50 may bias the first correlation 48A relative to the second correlation 48B in any suitable manner. In an embodiment shown in FIG. 4, the first correlation 48A is scaled by a first coefficient 52A, and the second correlation 48B is scaled by a second coefficient 52B. The scaled correlations are summed 54, and the summation compared 56 to a threshold Th, wherein the sector sync mark pattern is detected when the summation exceeds the threshold. In one embodiment, the coefficients 52A and 52B are selected in order to increase a weighting of the target sync mark pattern relative to the target data. For example, in one embodiment the first coefficient 52A may be eight, the second coefficient 52B may be one, and the threshold Th may be seventy-nine. If all ten bits in the first correlation 48A match (such that the first correlation 48A is ten), the scaled result is eighty which exceeds the threshold Th regardless as to the number of bits that match in the second correlation 48B. If nine of ten bits in the first correlation 48A match (such that the first correlation 48A is nine), the scaled correlation (after multiplying by the first coefficient 52A) will equal seventy-two. Accordingly, the sector sync mark pattern will only be detected if all of the bits in the second correlation 52B match (which means the output of adder 54 is eighty). If less than all of the bits match in the second correlation 48B, then the sector sync mark pattern is not detected.

The first and second coefficients 52A and 52B as well as the threshold Th may comprise any suitable values (including fractional values) such that the first correlation 48A is given more weight relative to the second correlation 48B. In other embodiments, the coefficient values and a threshold Th may be selected such that the sector sync mark pattern is detected when there is more than one mismatched bit in the first correlation 48A. For example, if the first coefficient 52A is eight, the second coefficient 52B is two, and the threshold Th is seventy-nine, then the sector sync mark pattern is detected if eight of ten bits in the first correlation 48A match and all eight bits in the second correlation 48B match.

Figure 5:
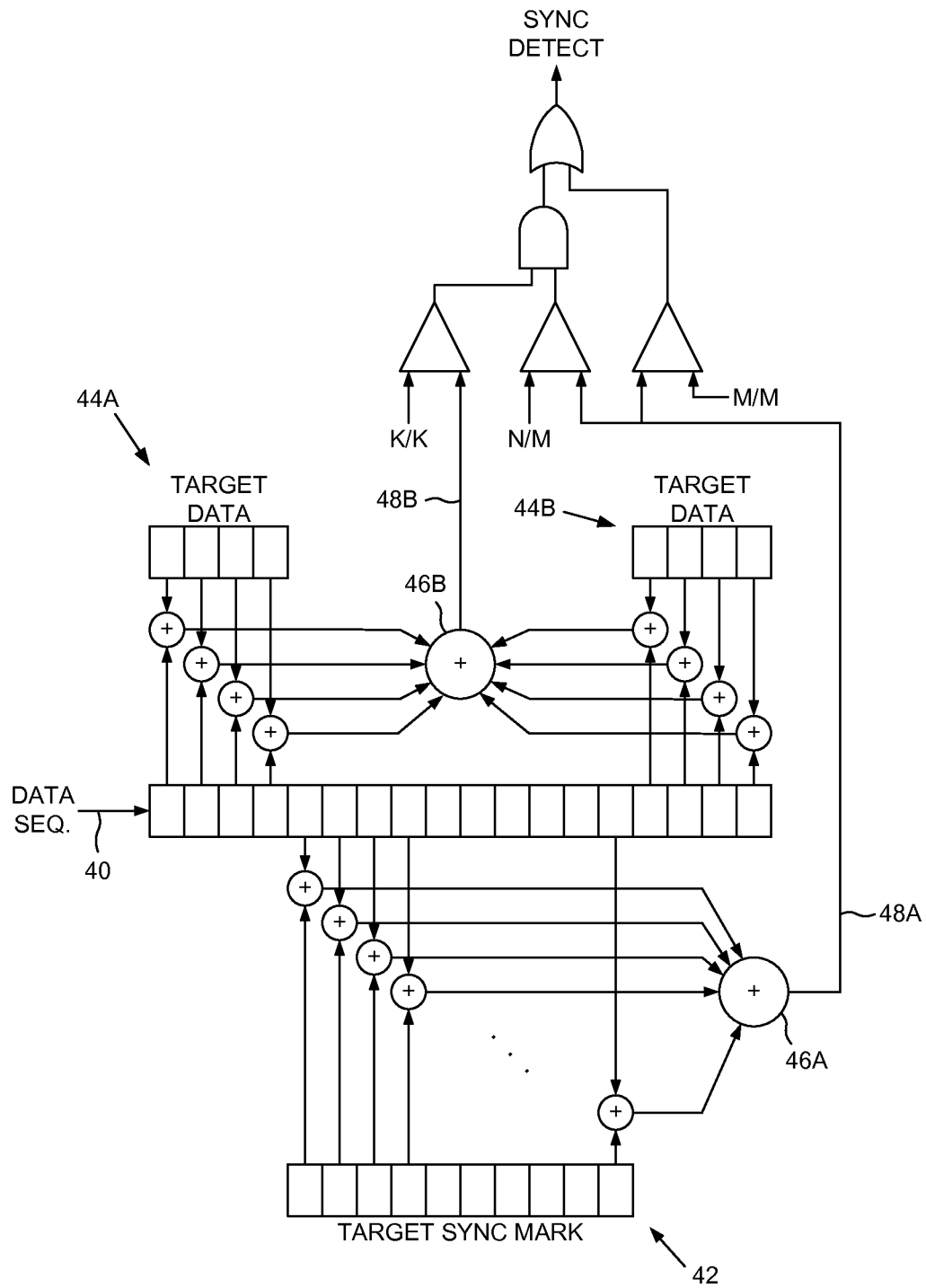
FIG. 5 shows an embodiment of the present invention wherein an output of the first correlator is compared to two thresholds in order to bias the relative correlations.

FIG. 5 shows an alternative embodiment for the sync mark detector 50 wherein the first correlation 48A is compared to multiple thresholds. If all M/M bits match in the first correlation 48A, then the sector sync mark pattern is detected. If less than all of the bits match (N/M bits match), then the sector sync mark pattern is detected only if all K/K bits match in the second correlation 48A. Any suitable value may be selected for N, such as (M−1) similar to the embodiment described above with reference to FIG. 4.

Figure 6:
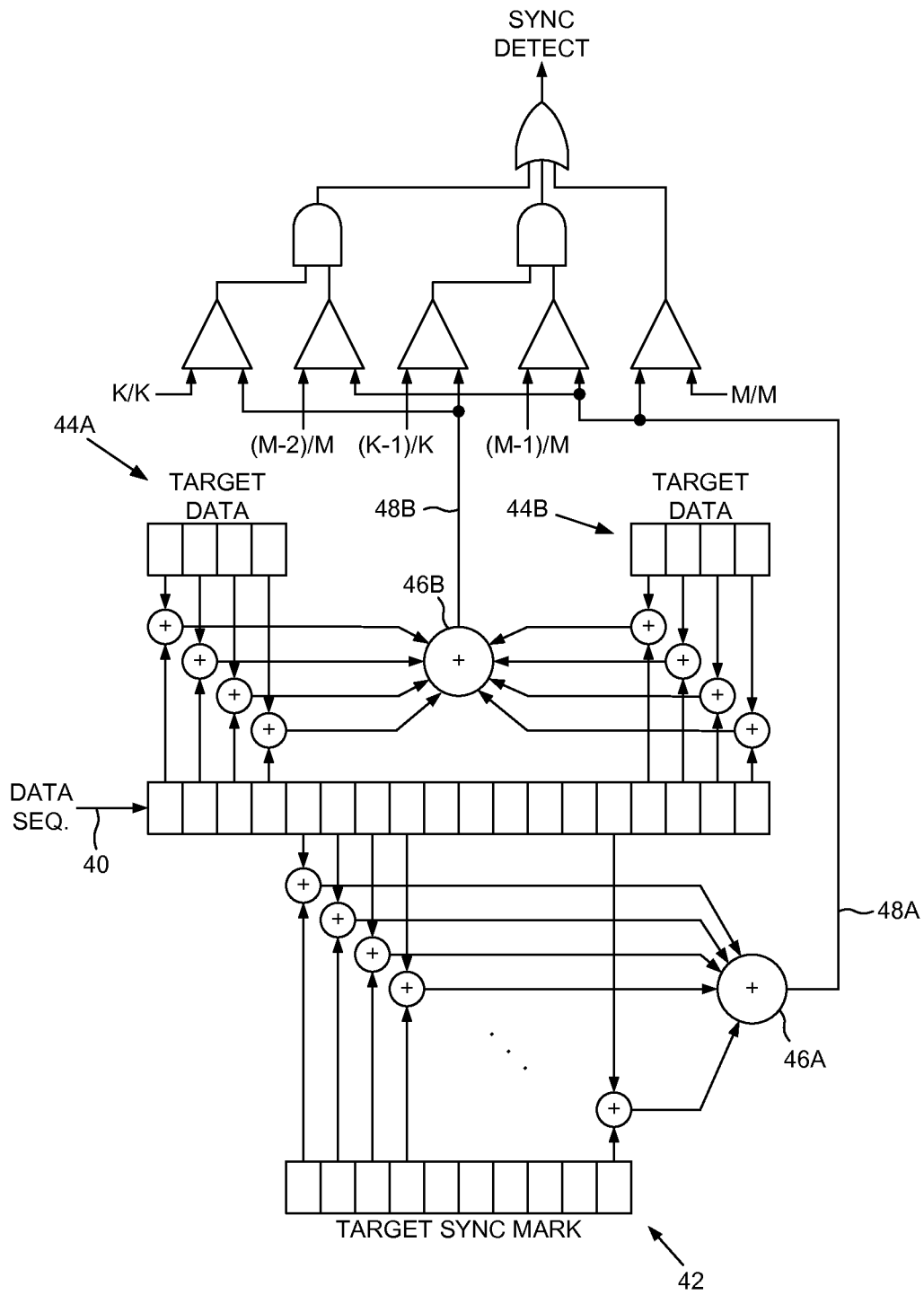
FIG. 6 shows an embodiment of the present invention wherein an output of the first and second correlators are compared to respective thresholds in order to bias the relative correlations.

FIG. 6 shows an embodiment for the sync mark detector 50 wherein the first and second correlations 48A and 48B are compared to multiple thresholds relative to a number of bits that match in each correlation. In the example of FIG. 6, the sector sync mark pattern is detected if all M/M bits match in the first correlation 48A. If (M−1)/M of the bits match in the first correlation 48A, then the sector sync mark pattern is detected only if at least (K−1)/K of the bits match in the second correlation 48B. If (M−2)/M of the bits match in the first correlation 48A, then the sector sync mark pattern is detected only if all K/K bits match in the second correlation 48B. In this embodiment, the higher the number of mismatched bits in the first correlation 48A, the lower the number of mismatched bits must be in the second correlation 48B in order to detect the sector sync mark pattern.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of sectors each comprising a sector sync mark pattern and sector data preceding and following the sector sync mark pattern;
   a head actuated over the disk for generating a read signal; and
   control circuitry operable to:
      detect a data sequence from the read signal;
      correlate the data sequence with an extended sync mark comprising a target sync mark pattern and target data; and
      bias the correlation of the target sync mark pattern with the data sequence relative to the correlation of the target data with the data sequence.

2. The disk drive as recited in claim 1, wherein the control circuitry is operable to bias the correlation of the target sync mark pattern with the data sequence by increasing a weighting of the target sync mark pattern relative to the target data.

3. The disk drive as recited in claim 2, wherein the control circuitry comprises a first coefficient operable to bias the correlation of the target sync mark pattern with the data sequence.

4. The disk drive as recited in claim 3, wherein the control circuitry comprises a second coefficient operable to bias the correlation of the target data with the data sequence.

5. The disk drive as recited in claim 2, wherein the control circuitry comprises:
a first correlator operable to correlate the target sync mark pattern with the data sequence; and
a second correlator operable to correlate the target data with the data sequence, wherein:
the control circuitry is operable to detect the sector sync mark pattern in the data sequence when an output of the first correlator exceeds a first threshold; and
when the output of the first correlator does not exceed the first threshold, the control circuitry is operable to detect the sector sync mark pattern in the data sequence when the output of the first correlator exceeds a second threshold lower than the first threshold and an output of the second correlator exceeds a third threshold.

6. The disk drive as recited in claim 5, wherein:
the target sync mark pattern comprises a plurality of bits;
the data sequence comprises a plurality of bits; and
the output of the first correlator exceeds the first threshold when a first plurality of bits in the data sequence matches all of the bits in the target sync mark pattern.

7. The disk drive as recited in claim 6, wherein:
the target data comprises a plurality of bits;
the output of the first correlator exceeds the second threshold when a first plurality of bits in the data sequence matches less than all the bits in the target sync mark pattern; and
the output of the second correlator exceeds the third threshold when a second plurality of bits in the data sequence matches all of the bits in the target data.

8. The disk drive as recited in claim 1, wherein:
the sector comprises a servo sector; and
the target data corresponds to at least one of the sector data preceding and following the sector sync mark pattern.

9. The disk drive as recited in claim 8, wherein the sector data comprises at least part of a preamble preceding the sector sync mark pattern.

10. The disk drive as recited in claim 8, wherein the sector data comprises at least part of a track address following the sector sync mark pattern.

11. The disk drive as recited in claim 1, wherein:
the sector comprises a data sector; and
the target data corresponds to at least one of the sector data preceding and following the sector sync mark pattern.

12. The disk drive as recited in claim 11, wherein the sector data comprises at least part of a preamble preceding the sector sync mark pattern.

13. A method of operating a disk drive comprising a disk comprising a plurality of sectors each comprising a sector sync mark pattern and sector data preceding and following the sector sync mark pattern, and a head actuated over the disk for generating a read signal, the method comprising:
detecting a data sequence from the read signal;
correlating the data sequence with an extended sync mark comprising a target sync mark pattern and target data; and
biasing the correlation of the target sync mark pattern with the data sequence relative to the correlation of the target data with the data sequence.

14. The method as recited in claim 13, wherein biasing the correlation of the target sync mark pattern with the data sequence comprises increasing a weighting of the target sync mark pattern relative to the target data.

15. The method as recited in claim 14, wherein biasing the correlation of the target sync mark pattern with the data sequence comprises scaling the correlation with a first coefficient.

16. The method as recited in claim 15, further comprising biasing the correlation of the target data with the data sequence by scaling the correlation with a second coefficient.

17. The method as recited in claim 14, further comprising:
first correlating the target sync mark pattern with the data sequence;
second correlating the target data with the data sequence;
detecting the sector sync mark pattern in the data sequence when the first correlating exceeds a first threshold; and
when the first correlating not exceed the first threshold, detecting the sector sync mark pattern in the data sequence when the first correlating exceeds a second threshold lower than the first threshold and the second correlating exceeds a third threshold.

18. The method as recited in claim 17, wherein:
the target sync mark pattern comprises a plurality of bits;
the data sequence comprises a plurality of bits; and
the first correlating exceeds the first threshold when a first plurality of bits in the data sequence matches all of the bits in the target sync mark pattern.

19. The method as recited in claim 18, wherein:
the target data comprises a plurality of bits;
the first correlating exceeds the second threshold when a first plurality of bits in the data sequence matches less than all the bits in the target sync mark pattern; and
the second correlating exceeds the third threshold when a second plurality of bits in the data sequence matches all of the bits in the target data.

20. The method as recited in claim 13, wherein:
the sector comprises a servo sector; and
the target data corresponds to at least one of the sector data preceding and following the sector sync mark pattern.

21. The method as recited in claim 20, wherein the sector data comprises at least part of a preamble preceding the sector sync mark pattern.

22. The method as recited in claim 20, wherein the sector data comprises at least part of a track address following the sector sync mark pattern.

23. The method as recited in claim 13, wherein:
the sector comprises a data sector; and
the target data corresponds to at least one of the sector data preceding and following the sector sync mark pattern.

24. The method as recited in claim 23, wherein the sector data comprises at least part of a preamble preceding the sector sync mark pattern.

* * * * *